United States Patent
Shuto

(10) Patent No.: US 8,387,451 B2
(45) Date of Patent: Mar. 5, 2013

(54) APPARATUS AND METHOD FOR DETECTING DECREASE IN TIRE AIR PRESSURE AND PROGRAM FOR DETECTING DECREASE IN TIRE AIR PRESSURE

(75) Inventor: Keisuke Shuto, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 104 days.

(21) Appl. No.: 13/173,832

(22) Filed: Jun. 30, 2011

(65) Prior Publication Data
US 2012/0118056 A1    May 17, 2012

(30) Foreign Application Priority Data

Nov. 17, 2010   (JP) ................................. 2010-256451

(51) Int. Cl.
*B60C 23/02*   (2006.01)
*B60C 23/00*   (2006.01)

(52) U.S. Cl. ................ 73/146.3; 340/443; 701/33.4

(58) Field of Classification Search .......... 73/146–146.8
See application file for complete search history.

(56) References Cited

U.S. PATENT DOCUMENTS

| | | | |
|---|---|---|---|
| 4,876,528 A | | 10/1989 | Walker et al. |
| 6,137,400 A | * | 10/2000 | Yanase et al. ................. 340/442 |
| 2001/0030600 A1 | * | 10/2001 | Arita et al. .................... 340/443 |
| 2002/0021212 A1 | * | 2/2002 | Arita et al. .................... 340/442 |
| 2003/0233209 A1 | * | 12/2003 | Yanase ........................... 702/145 |
| 2004/0134269 A1 | * | 7/2004 | Sugisawa ......................... 73/146 |
| 2009/0256696 A1 | * | 10/2009 | Miyamoto et al. ............ 340/443 |
| 2009/0261961 A1 | * | 10/2009 | Miyamoto ..................... 340/444 |
| 2010/0126264 A1 | * | 5/2010 | Oshiro ......................... 73/146.2 |
| 2011/0271745 A1 | * | 11/2011 | Oshiro .............................. 73/49 |
| 2011/0282544 A1 | * | 11/2011 | Oshiro ............................ 701/35 |
| 2012/0245787 A1 | * | 9/2012 | Kawasaki .................... 701/29.1 |

FOREIGN PATENT DOCUMENTS

| | | |
|---|---|---|
| JP | 63-305011 A | 12/1988 |
| JP | 2004-322964 A | 11/2004 |

* cited by examiner

*Primary Examiner* — Andre Allen
(74) *Attorney, Agent, or Firm* — Birch, Stewart, Kolasch & Birch, LLP

(57) ABSTRACT

A method for detecting a decrease in tire air pressure based on wheel rotation speed information obtained from tires attached to a four-wheel vehicle. The method includes: a wheel rotation speed information detection step for detecting wheel rotation speed information of the respective tires; a first storage step for storing the wheel rotation speed information; a decreased pressure determination step for determining, based on the wheel rotation speed information, a decrease in tire air pressure; a second storage step for storing a relation between a standard driving torque and a vehicle speed obtained in advance; a decreased pressure determination prohibition step for prohibiting the determination of a decrease in tire air pressure when a vehicle turning radius is lower than a predetermined threshold value determined by the relation, and a decreased pressure determination start step for starting the determination of a decrease in tire air pressure when the turning radius is equal to or higher than the predetermined threshold value.

6 Claims, 8 Drawing Sheets (a)

(b)

(a)

(b)

APPARATUS AND METHOD FOR DETECTING DECREASE IN TIRE AIR PRESSURE AND PROGRAM FOR DETECTING DECREASE IN TIRE AIR PRESSURE

TECHNICAL FIELD

The present invention relates to an apparatus and a method for detecting a decrease in tire air pressure, and a program for detecting a decrease in tire air pressure.

BACKGROUND ART

Conventionally, there has been an apparatus for detecting a decrease in tire air pressure (DWS) for detecting a decreased pressure of the tire based on the rotation speed information (wheel speed) regarding four tires attached to a vehicle. This apparatus uses a principle according to which a tire having a decreased pressure shows a reduced outer diameter (tire dynamic loaded radius) compared to that of tires having a normal internal pressure and thus shows an increased rotation angular velocity compared to that of other tires having a normal internal pressure. Various methods have been suggested to determine a decreased pressure. In the case of a method of detecting a decreased internal pressure based on a relative difference in the rotation angular velocities of the tires for example, the following formula (1) is used for a determination value (see Patent Literature 1 for example).

$$DEL=\{(F1+F4)/2-(F2+F3)/2\}/\{(F1+F2+F3+F4)/4\} \times 100(\%) \quad (1)$$

In the formula, F1 to F4 mean the rotation angular velocities of a left front tire (FL), a right front tire (FR), a left rear tire (RL), and a right rear tire (RR), respectively.

In the case of the method disclosed in Patent Literature 1, this determination value DEL is calculated, and then subjected to a required correction such as a cornering correction and to a rejection of unnecessary data. When the resultant DEL exceeds a threshold value set in advance, it is determined that there is occurred a tire deflation.

However, under running conditions influenced by a high torque by a driving wheel such as an upward slope or a towing running, the driving wheel tire tends to slip. Thus, there may be a case where, even when the air pressure is normal, this air pressure is erroneously determined as a decreased pressure and a false alarm is issued.

In order to prevent such a false alarm, a method has been suggested according to which the torque information from an engine control unit is used to calculate the torque of the driving wheel. When a difference between this driving wheel torque and a driving wheel torque calculated in advance that is required for the vehicle to run on a flat road at a fixed speed (hereinafter also referred to as "standard driving wheel torque") exceeds a threshold value set in advance, the data obtained at this time is assumed as unnecessary data and is rejected (see Patent Literature 2).

In the case of the method disclosed in Patent Publication 2, when the driving wheel torque is within the hatched area in FIG. 6 (i.e., when the driving wheel torque is equal to or higher than the positive threshold value Tth1 set in advance and when the driving wheel torque is equal to or lower than the negative threshold value Tth2 set in advance), the determination of a decrease in tire air pressure is prohibited. When the driving wheel torque is within areas other than the hatched area, the determination of a decrease in tire air pressure is allowed. The rejection processing as described above reduces the variation in the decreased pressure determination value when the vehicle is running on an upward slope or is performing a towing running, thus preventing a false alarm from occurring.

In the case of the method disclosed in Patent Literature 2, however, when the vehicle is running on such a road that includes both of an upward slope (or a downward slope) and a curve, the variation in the decreased pressure determination value is caused even when the air pressure is normal, which may cause a false alarm.

In view of the above, the present applicant has suggested to change, as the driving wheel torque is more away from the standard driving torque (for which a difference between the driving wheel torque and the standard driving torque is called a Δtorque. See FIG. 7.), the threshold value for rejecting a lateral acceleration (lateral G) in order to prevent the data when the vehicle is turning while moving upward or downward from being used to determine a decrease in tire air pressure (German Patent Application No. 102009020784.8. Hereinafter referred to as the invention of the prior application).

In the method according to the invention of the prior application, a yaw rate value is received from the sensor attached to the vehicle and the lateral G can be calculated based on the yaw rate value and the vehicle running speed. In FIG. 8($a$) or FIG. 8($b$), when the torque and the lateral G are within the hatched area, the determination of a decrease in tire air pressure is allowed. When the Δtorque and the lateral G are within areas other than the hatched area on the other hand, the determination of a decrease in tire air pressure is prohibited.

The difference between FIG. 8($a$) and FIG. 8($b$) will be described. In the case of FIG. 8($a$), the possibility can be reduced where an alarm is issued even when there is no decrease in tire air pressure. However, the range of usable data is narrow and thus more data is rejected, thereby suppressing data used for the determination of a decreased pressure from being collected. This consequently may cause a case where a long time is required to issue an alarm for notifying a decrease in tire air pressure. In the case of FIG. 8($b$) on the other hand, the range of usable data is wide so that data can be used when the lateral G is low even when Δtorque is high. Thus, FIG. 8($b$) requires a shorter time to issue an alarm for notifying a decrease in tire air pressure than in the case of FIG. 8($a$).

In the case of the method according to the invention of the prior application, data when the vehicle is turning while moving upward or downward can be rejected and thus such data can be obtained that is under more ideal conditions (i.e., under conditions close to those where the vehicle is running straight on a flat road). This can consequently reduce the variation in the decreased pressure determination value DEL to thereby prevent a false alarm from occurring.

CITATION LIST

Patent Literature

{PTL1} Japanese Unexamined Patent Publication No. 1988-305011
{PTL2} Japanese Unexamined Patent Publication No. 2004-322964

SUMMARY OF INVENTION

Technical Problem

In the method according to the invention of the prior application, for the purpose of obtaining data under conditions close to those where the vehicle is running straight on a flat road, the lateral G is used as an index for data rejection. This lateral G is represented by: (the square of the vehicle speed)/ (turning radius). In order to securely prevent a false alarm from occurring, data obtained during the turning of the vehicle must be rejected. However, as can be seen from the above formula for the lateral G, the lateral G has a low value when the vehicle is running at a low speed, even during turning. Thus, the data obtained at that time cannot be rejected and thus is undesirably used for the determination of a decreased pressure. This consequently causes an increased variation in the decreased pressure determination value DEL, which may cause a false alarm.

The present invention has been made in view of the situation as described above. It is an object of the present invention to provide an apparatus and a method for detecting a decrease in tire air pressure as well as a program for detecting a decrease in tire air pressure by which the data obtained when the vehicle is running while turning on an upward slope or a downward slope can be rejected to thereby reduce the variation of the decreased pressure determination value, thus securely prevent a false alarm from occurring.

Solution to Problem (1) In accordance with the present invention, there is provided a method for detecting a decrease in tire air pressure (hereinafter also simply referred to as "detection method") based on wheel rotation speed information obtained from tires attached to a four-wheel vehicle, comprising:

a wheel rotation speed information detection step for detecting wheel rotation speed information of the respective tires;

a first storage step for storing the wheel rotation speed information detected in the rotation speed information detection step;

a decreased pressure determination step for determining, based on the wheel rotation speed information, a decrease in tire air pressure;

a second storage step for, assuming that a driving wheel torque required for a vehicle to run on a flat road at a fixed speed is a standard driving torque, storing a relation between the standard driving torque and a vehicle speed obtained in advance;

a decreased pressure determination prohibition step for prohibiting the determination of a decrease in tire air pressure based on the wheel rotation speed information when a vehicle turning radius is lower than a predetermined threshold value determined by the relation between the driving wheel torque and the standard driving torque depending on the vehicle speed; and a decreased pressure determination start step for starting the determination of a decrease in tire air pressure based on the wheel rotation speed information when the turning radius is equal to or higher than the predetermined threshold value.

In the detection method of the present invention, using as a reference the predetermined threshold value determined by the relation between the driving wheel torque and the standard driving torque depending on the vehicle speed, it is determined that the vehicle is running while turning on an upward slope or a downward slope when the vehicle turning radius is lower than the threshold value. Then, the determination of a decrease in tire air pressure based on the wheel rotation speed information obtained at that time is prohibited. This can consequently reduce the variation of the decreased pressure determination value calculated based on the wheel rotation speed information, thus securely preventing a false alarm from occurring.

(2) In the detection method of (1), the relation can be a difference between the driving wheel torque and the standard driving torque depending on the vehicle speed.

(3) In accordance with the present invention, there is further provided an apparatus for detecting a decrease in tire air pressure (hereinafter also simply referred to as "detection apparatus") based on wheel rotation speed information obtained from tires attached to a four-wheel vehicle, comprising:

a wheel rotation speed information detection means for detecting wheel rotation speed information of the respective tires;

a first storage means for storing the wheel rotation speed information detected by the wheel rotation speed information detection means;

a decreased pressure determination means for determining, based on the wheel rotation speed information, a decrease in tire air pressure;

a second storage means for, assuming that a driving wheel torque required for a vehicle to run on a flat road at a fixed speed is a standard driving torque, storing a relation between the standard driving torque and a vehicle speed obtained in advance;

a decreased pressure determination prohibition means for prohibiting the determination of a decrease in tire air pressure based on the wheel rotation speed information when a vehicle turning radius is lower than a predetermined threshold value determined by the relation between the driving wheel torque and the standard driving torque, and a decreased pressure determination start means for starting the determination of a decrease in tire air pressure based on the wheel rotation speed information when the turning radius is equal to or higher than the predetermined threshold value.

In the detection apparatus of the present invention, using as a reference the predetermined threshold value determined by the relation between the driving wheel torque and the standard driving torque depending on the vehicle speed, the decreased pressure determination prohibition means determines that the vehicle is running while turning on an upward slope or a downward slope when the vehicle turning radius is lower than the threshold value. Then, the determination of a decrease in tire air pressure based on the wheel rotation speed information obtained at that time is prohibited. This can consequently reduce the variation of the decreased pressure determination value calculated based on the wheel rotation speed information, thus securely preventing a false alarm from occurring.

(4) In the detection apparatus of (3), the relation can be a difference between the driving wheel torque and the standard driving torque depending on the vehicle speed.

(5) In accordance with the present invention there is also provided a program for detecting a decrease in tire air pressure (hereinafter also simply referred to as "program") which causes, in order to determine a decrease in tire air pressure based on wheel rotation speed information obtained from tires attached to a four-wheel vehicle, a computer to function as:

a first storage means for storing wheel rotation speed information detected by wheel rotation speed information detection means for detecting wheel rotation speed information of the respective tires;

a decreased pressure determination means for determining, based on the wheel rotation speed information, a decrease in tire air pressure;

a second storage means for, assuming that a driving wheel torque required for a vehicle to run on a flat road at a fixed speed is a standard driving torque, storing a relation between the standard driving torque and a vehicle speed obtained in advance;

a decreased pressure determination prohibition means for prohibiting the determination of a decrease in tire air pressure based on the wheel rotation speed information when a vehicle turning radius is lower than a predetermined threshold value determined by the relation between the driving wheel torque and the standard driving torque depending on the vehicle speed, and a decreased pressure determination start means for starting the determination of a decrease in tire air pressure based on the wheel rotation speed information when the turning radius is equal to or higher than the predetermined threshold value.

(6) In the program of (5), the relation can be a difference between the drive wheel torque and the standard driving torque depending on the vehicle speed.

Advantageous Effects of Invention

According to the detection apparatus and method and the program of the present invention, the data obtained when the vehicle is running while turning on an upward slope or a downward slope can be rejected to thereby reduce the variation of the decreased pressure determination value, thus securely preventing a false alarm from occurring.

DESCRIPTION OF EMBODIMENTS

Figure 1:
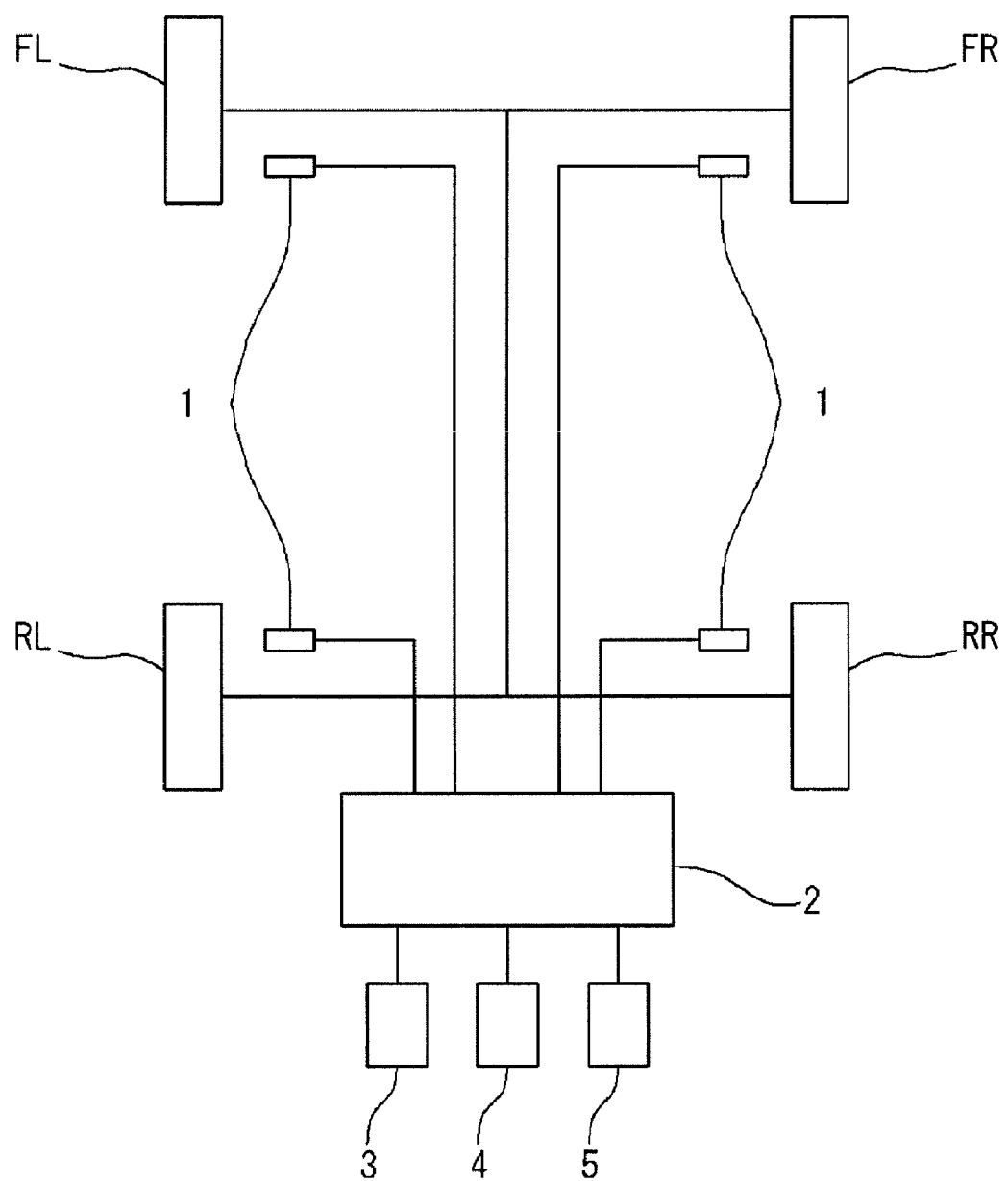
FIG. 1 is a block diagram illustrating one embodiment of a detection apparatus of the present invention.

Hereinafter, with reference to the attached drawings, an embodiment of a detection apparatus and method and a program of the present invention will be described in detail. FIG. 1 is a block diagram illustrating one embodiment of a detection apparatus of the present invention, and FIG. 2 is a block diagram illustrating an electric configuration of the detection apparatus shown in FIG. 1.

As shown in FIG. 1, a detection apparatus according to one embodiment of the present invention includes a normal wheel speed detection means (wheel rotation speed information detection means) 1 in order to detect the rotation speeds of four tires provided in a four-wheel vehicle of a left front wheel (FL), a right front wheel (FR), a left rear wheel (RL), and a right rear wheel (RR). The normal wheel speed detection means (wheel rotation speed information detection means) 1 is provided to be associated with the respective tires.

The wheel speed detection means 1 may be, for example, a wheel speed sensor that uses an electromagnetic pickup for example to generate a rotation pulse to measure a rotation angular velocity and a wheel speed based on the number of pulses or an angular velocity sensor such as a one that generates power using rotation as in a dynamo to measure a rotation angular velocity and a wheel speed based on the voltage. The output from the wheel speed detection means 1 is given to a control unit 2 that is a computer such as ABS. Connected to the control unit 2 are a display unit 3 comprising a liquid crystal display element, a plasma display element or CRT for example for displaying a tire having a decreased air pressure, an initialization button 4 that can be operated by a driver; and an alarm unit 5 for notifying a driver of a tire having a decreased air pressure.

Figure 2:
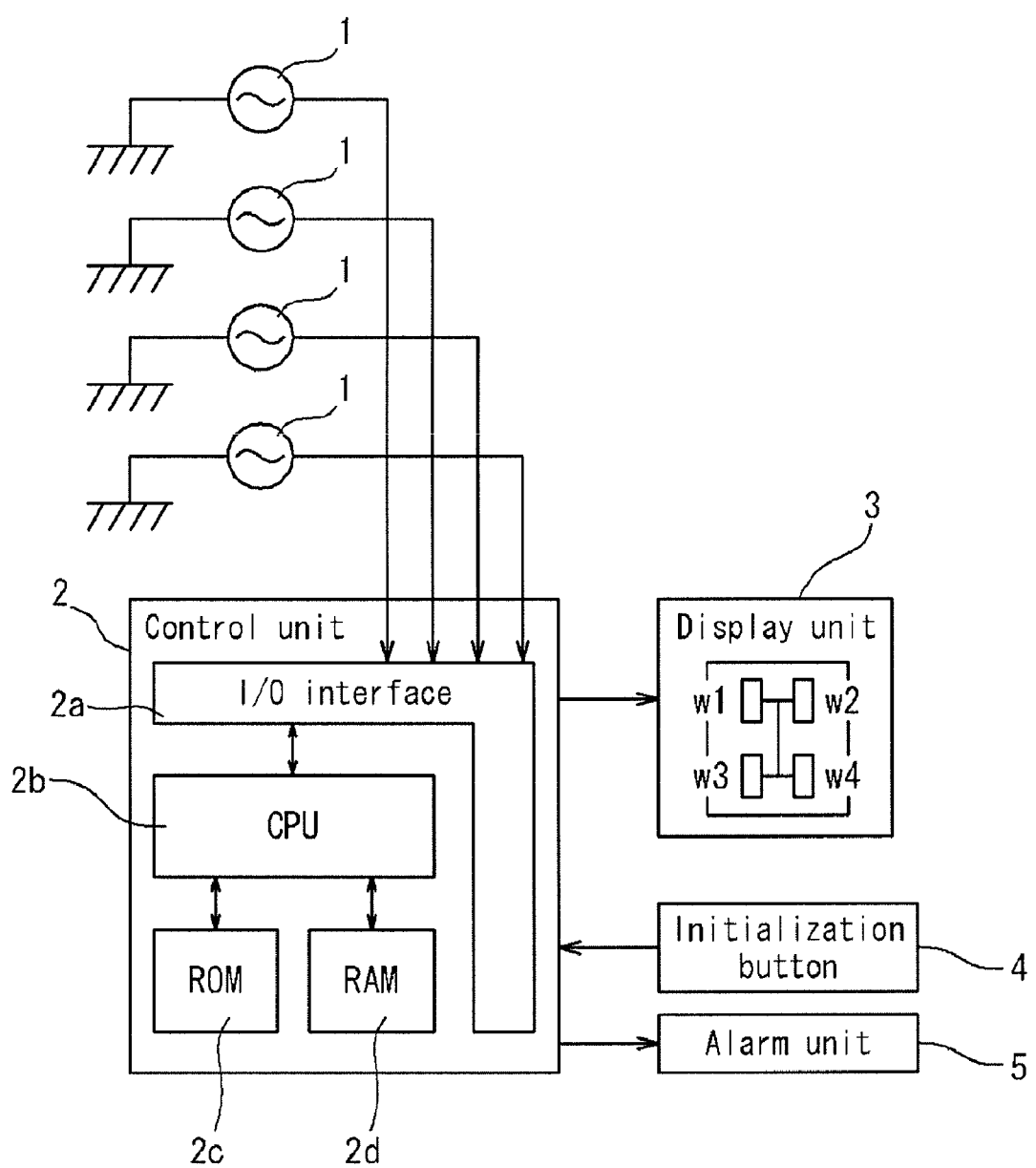
FIG. 2 is a block diagram illustrating an electric configuration of the detection apparatus shown in FIG. 1.

As shown in FIG. 2, the control unit 2 is composed of: an I/O interface 2a required for the exchange of a signal with an external apparatus; a CPU 2b functioning as a computation processing center; a ROM 2c storing therein a control operation program of this CPU 2b; and a RAM 2d into which data is temporarily written or from which the written data is read out when the CPU 2b performs a control operation.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, rotation angular velocities $F_i$ of the respective tires ($F_1$ to $F_4$) at every predetermined sampling cycle ΔT (sec) (e.g., ΔT=0.05 second). $F_1$ to $F_4$ represent angular velocities of a left front wheel (FL) tire, a right front wheel (FR) tire, a left rear wheel (RL) tire, and a right rear wheel (RR) tire, respectively.

Since tires are manufactured to include variations within a standard (initial difference), the respective tires do not always have an identical effective rolling radius (a value obtained by dividing a distance of one rotation by $2\pi$) even when all of the tires have a normal internal pressure. Due to this reason, the respective tires have varied rotation angular velocities $F_i$. To solve this, a corrected angular velocity $F1_i$ is calculated in order to cancel the variation due to the initial difference. Specifically, the correction is made as shown below.

$F1_1 = F_1$
$F1_2 = mF_2$
$F1_3 = F_3$
$F1_4 = nF_4$

The correction factors m and n are acquired by, for example, calculating the rotation angular velocity $F_i$ based on a condition that the vehicle is running on a straight line to assume $m=F_1/F_2$ and $n=F_3/F_4$ based on the calculated rotation angular velocity $F_i$.

Then, based on this $F_i$, the tire rotation speed is calculated. Based on the calculated rotation speed, the tire acceleration is calculated.

The detection apparatus according of the present embodiment is composed of: the wheel speed detection means 1 for detecting wheel rotation speed information for the respective tires attached to a four-wheel vehicle; a first storage means for storing the wheel rotation speed information detected by the wheel speed detection means 1; a decreased pressure determination means for determining, based on the wheel rotation speed information, a decrease in tire air pressure; a second storage means for, assuming that a driving wheel torque required for a vehicle to run on a flat road at a fixed speed is a standard driving torque, storing a relation between the standard driving torque and a vehicle speed obtained in advance; a decreased pressure determination prohibition means for prohibiting the determination of a decrease in tire air pressure based on the wheel rotation speed information when a vehicle turning radius is lower than a predetermined threshold value determined by the relation between the driving wheel torque and the standard driving torque, and a decreased pressure determination start means for starting the determination of a decrease in tire air pressure based on the wheel rotation speed information when the turning radius is equal to or higher than the predetermined threshold value.

The program of the present invention is installed in the control unit 2. The control unit 2 is caused to function as the first storage means, the decreased pressure determination means, the second storage means, the decreased pressure determination prohibition means, and the decreased pressure determination start means.

As described above, in the rejection method of the invention of the prior application, the magnitude of the lateral G is used as an index for rejection. Thus, when the vehicle is running while turning at a low speed, the lateral G does not have a high value and is within the hatched part shown in FIG. 8, thus preventing data rejection from being performed. Thus, a decreased pressure determination value obtained during the turning at a low speed is undesirably used to thereby cause a high variation of the decreased pressure determination value, which may cause a false alarm.

In contrast with this, the present embodiment combines the rejection based on the lateral G with the rejection based on a vehicle turning radius. The turning radius can be calculated, for example, based on a yaw rate value received from a sensor attached to the vehicle. Specifically, when assuming that the yaw rate value is y (rad/s) and the vehicle speed is V, then the relation of the turning radius=V/y(m) is established.

Since the turning radius value does not depend on the vehicle speed, even when the data rejection based on the lateral G is not performed during the turning of the vehicle at a low speed, data rejection can be carried out when the resultant turning radius value exceeds a predetermined threshold value.

Figure 3:
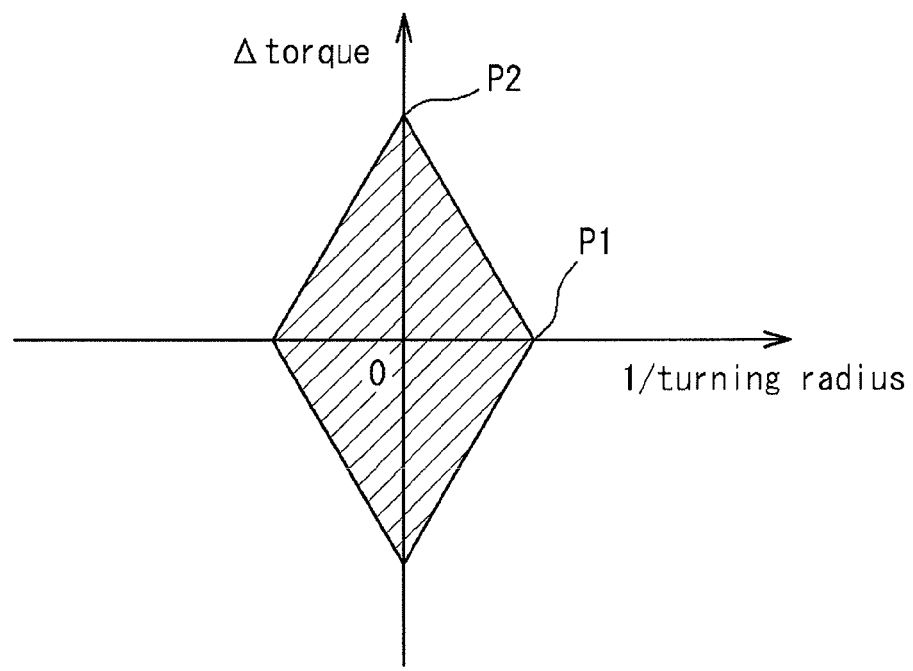
FIG. 3 illustrates the relation between the inverse number (1/turning radius) of the turning radius and Δtorque.
Figure 3:
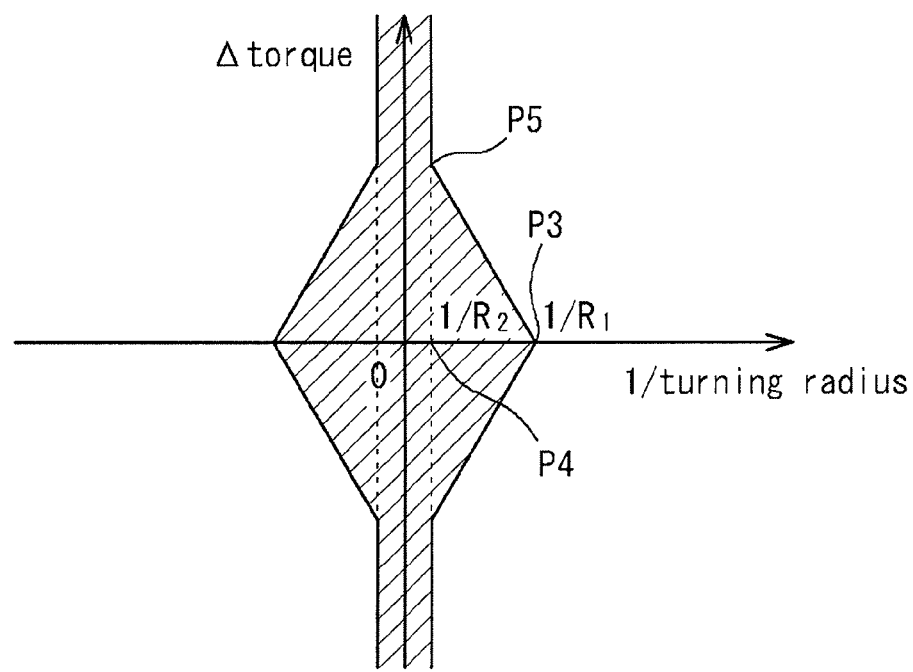

As in the invention of the prior application, the predetermined threshold value is caused to change depending on Δtorque (a difference between the driving wheel torque and the standard driving torque) as shown in FIG. 3. Specifically, the predetermined threshold value in the present embodiment is caused to change depending on the "difference" that represents the relation between the driving wheel torque and the standard driving torque. This can consequently reject such data that is obtained when the vehicle is turning while running on an upward slope or a downward slope at a low speed. Thus, this data can be prevented from being used to determine a decreased air pressure.

According to the rejection method as described above, there can be obtained only such data, even when the vehicle is running at a low speed, that is under more ideal conditions (i.e., conditions close to those where the vehicle is running straight on a flat road). This can consequently reduce the variation of the decreased pressure determination value calculated based on such data, thus securely preventing a false alarm from occurring.

Figure 8:
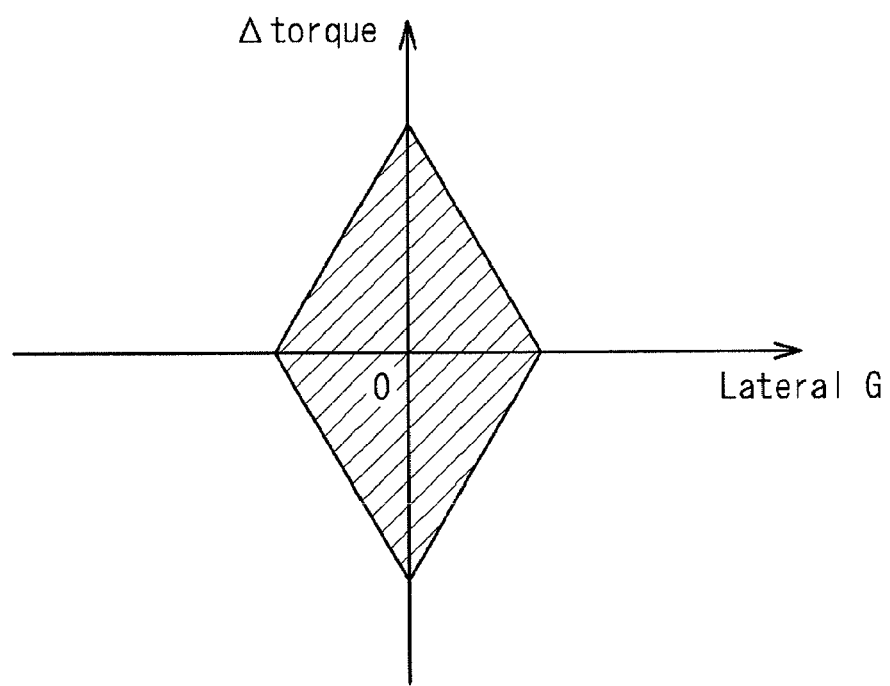
FIG. 8 illustrates the scope for using data in the invention of the prior application.
Figure 8:
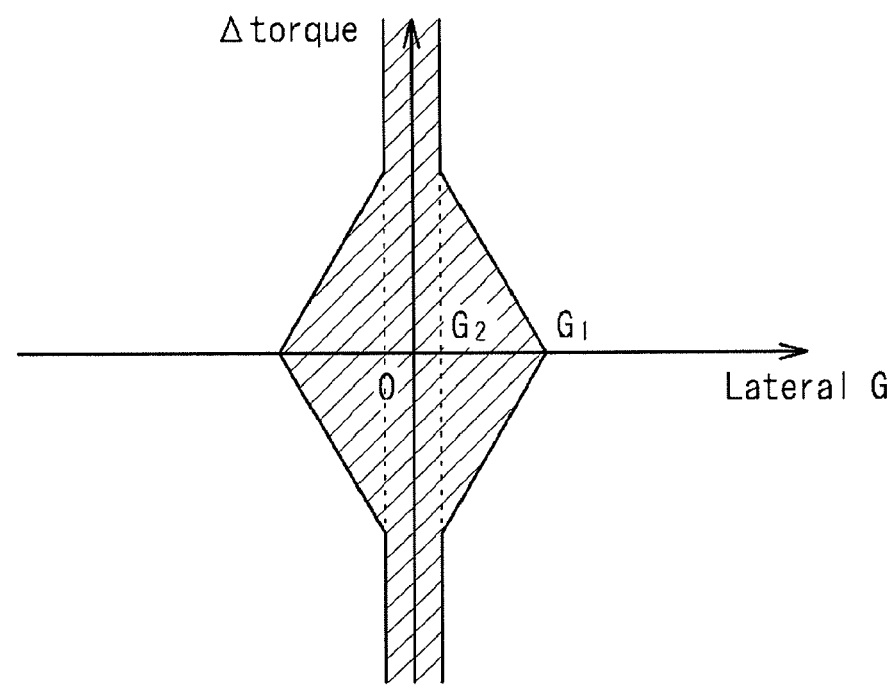

The difference between FIG. 3(*a*) and FIG. 3(*b*) is similar to the above-described difference between FIG. 8(*a*) and FIG. 8(*b*). Specifically, in the case of FIG. 3(*a*), although the possibility can be reduced where an alarm may be issued in spite of the fact that there is no decrease in tire air pressure, data can be used within a narrow scope and thus causes an increased number of data to be rejected, which suppresses data used for the determination of a decreased pressure from being collected, which may consequently cause a case where a long time is required to issue an alarm for notifying a decrease in tire air pressure. In the case of FIG. 3(*b*) on the other hand, data can be used in a wide range so that data can be used when the 1/turning radius is small, even when Δtorque is high. Thus, in the case of the FIG. 3(*b*), the time required to issue an alarm for notifying a decrease in tire air pressure can be shorter than in the case of FIG. 3(*a*).

The relation between the standard driving torque and the vehicle speed is calculated in advance by a running test. The term "standard driving torque" herein means a driving wheel torque required for the vehicle to maintain a fixed speed when the vehicle is running on a flat road under a wind-still and no-load condition (only one driver accommodated in the vehicle) measured in advance.

The standard driving torque as described above is generally caused by an air resistance. The air resistance is proportional to the square of the vehicle speed. Thus, as shown in the following formula, the standard driving torque can be represented by the quadratic expression of the vehicle speed.

$$\text{Standard driving torque} = A \times V^2 + B$$

In the expression, V is a vehicle speed and A and B are a coefficient calculated by a running test for each vehicle type. The vehicle speed V can be obtained, for example, by a vehicle speed sensor or GPS information. The vehicle speed V also can be an average value of the wheel speeds of the four wheels.

For the rejection scope of FIG. 3(*a*) (vertexes at the respective axes), the point shown by P1 can be determined based on the value of 1/turning radius when Δtorque=0 is established. The point shown by P2 can be determined based on the value of Δtorque when 1/turning radius=0 is established.

For the rejection scope of FIG. 3(*b*) (vertexes at the respective axes), the point shown by P3 can be determined based on $1/R_1$, the point shown by P4 can be determined based on $1/R_2$, and the point shown by P5 can be determined based on the value of Δtorque when $1/R_2$ is established.

The rejection scope as shown in FIG. 3 is different depending on a vehicle. The rejection scope may be selected by using, as an index, the ratio of the variation of the decreased pressure determination values to a threshold value when the rejection is applied. For example, when a threshold value for issuing an alarm for notifying a tire having a decreased pressure is 0.2, the rejection scope is determined so that the standard deviation is smaller than 10% of the threshold value (i.e., 0.02). This value of 10% is not a fixed value and can be appropriately changed depending on the accuracy required for the detection apparatus for example.

The value of 1/turning radius when Δtorque=0 is established in order to determine P1 in FIG. 3(*a*) can be, for example, −1/130 to 1/130 (1/m). The value of Δtorque when 1/turning radius=0 is established in order to determine P2 can be, for example, −80 to 80 (Nm). Similarly, the value of $1/R_1$ in order to determine P3 in FIG. 3(*b*) can be, for example, −1/130 to 1/130 (1/m). The value of $1/R_2$ in order to determine P4 can be, for example, −1/650 to 1/650 (1/m). The value of Δtorque when $1/R_2$ is established in order to determine P5 can be, for example, −64 to 64 (Nm).

The values for determining P1 to P5 are adjusted depending on the accuracy required for the detection apparatus. The values for determining P1 to P5 may be determined by appropriately changing a plurality of values or by fixing some values and changing other values.

EXAMPLE

Next, the detection method of the present invention will be described based on examples. However, the present invention is not limited to such examples only.

Example 1 and Comparative Example

An FF vehicle to which summer tires having a size of 205/55R16 were attached. Then, the vehicle was allowed to run on a curvy road including an upward slope or a downward slope (mountain path). Then, the variation of the decreased pressure determination values was investigated. The decreased pressure determination value was calculated using the formula (1) for the respective cases of a normal internal pressure (NP), a left front (FL) wheel having a 10%-decreased pressure, the FL wheel having a 30%-decreased pressure, a left rear (RL) wheel having a 10%-decreased pressure, and the RL wheel having a 30%-decreased pressure. In Comparison Example, based on the method of the invention of the prior application (FIG. 8(b)), the rejection based on the lateral G was performed. In Example 1, the rejection based on the lateral G was combined with the rejection based on the turning radius in the range as shown in FIG. 3(a).

The scope of the rejection based on the lateral G in Comparison Example was that the value of $G_1$ when Δtorque=0 is established is 0.2 (G), the value of $G_2$ when Δtorque=0 is established is 0.05 (G), and the value of Δtorque when $G_2$=0.05 is established is 60 (Nm). In Example 1, the value of 1/turning radius when Δtorque=0 is established is 1/130 (1/m) and the value of Δtorque when 1/turning radius=0 is established is 80 (Nm).

Figure 4:
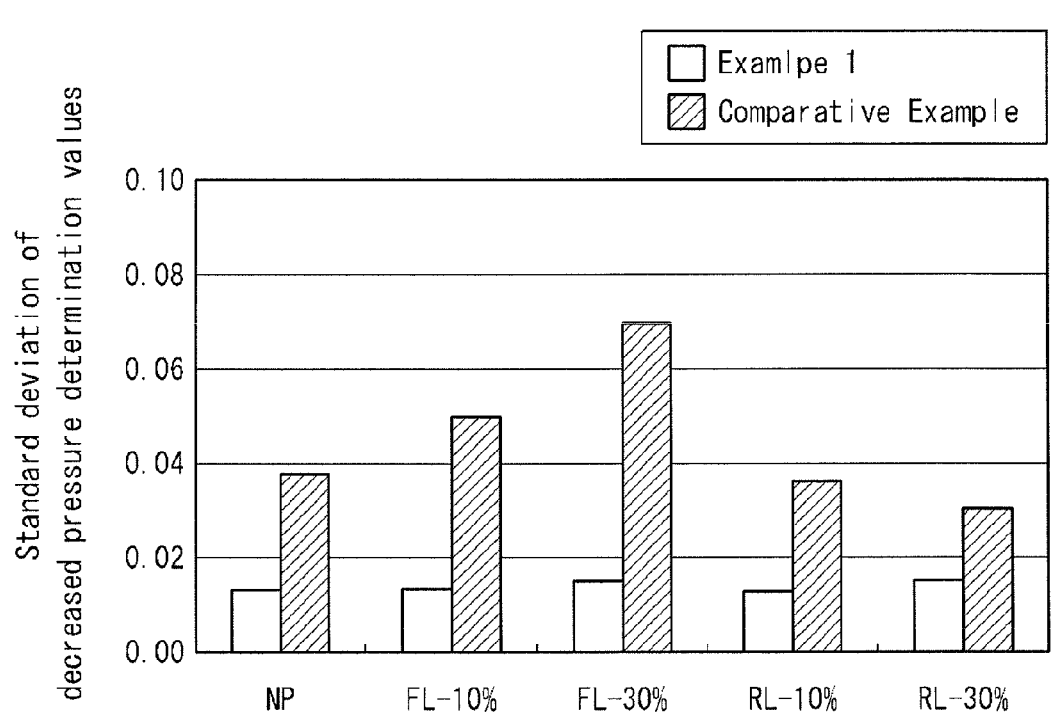
FIG. 4 illustrates the standard deviation of the decreased pressure determination values in Example 1 and Comparative Example.

The result is shown in FIG. 4.

Example 2 and Comparative Example

In the same manner as in Example 1 except for that the rejection scope based on the turning radius is changed, the variation of the decreased pressure determination values was investigated. In Example 2, the rejection scope based on the turning radius was as shown in FIG. 3(b).

The scope of the rejection based on the lateral G in Comparison Example was that the value of $G_1$ when Δtorque=0 is established is 0.2 (G), the value of $G_2$ when Δtorque=0 is established is 0.05 (G), and the value of Δtorque when $G_2$=0.05 is established is 60 (Nm). In Example 2, the value of $1/R_1$ when Δtorque=0 is established is 1/130 (1/m), the value of $1/R_2$ when Δtorque=0 is established is 1/650 (1/m), and the value of Δtorque when $1/R_2$=1/650 is established is 64 (Nm).

Figure 5:
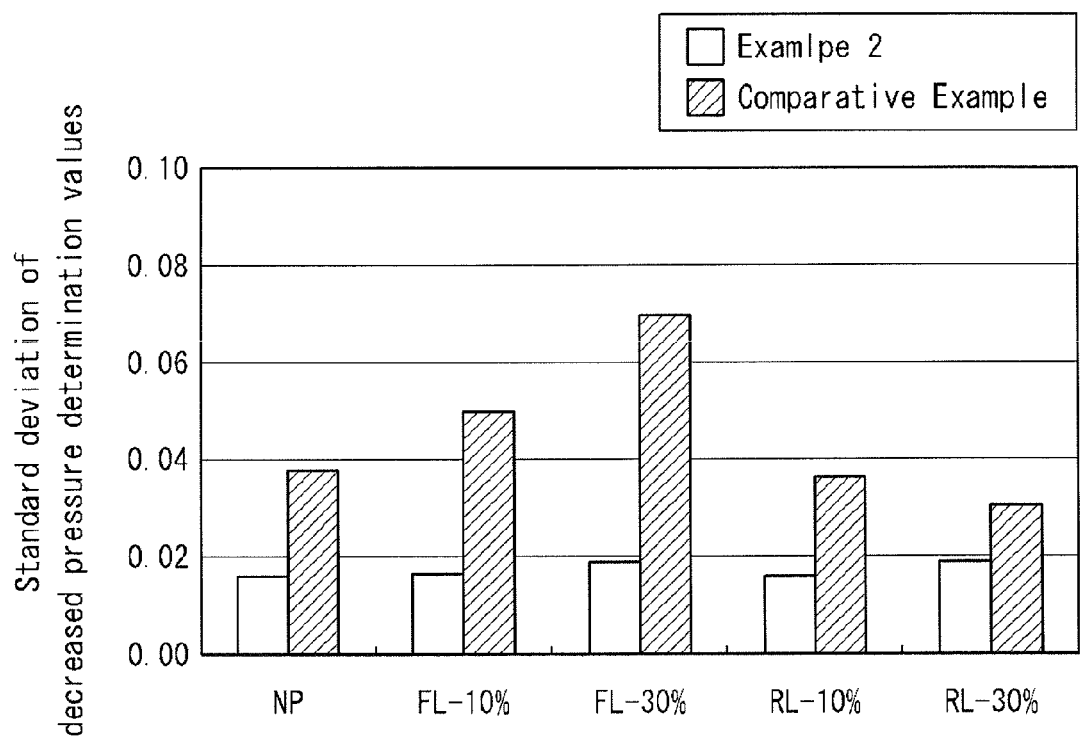
FIG. 5 illustrates the standard deviation of the decreased pressure determination values in Example 2 and Comparative Example.
Figure 6:
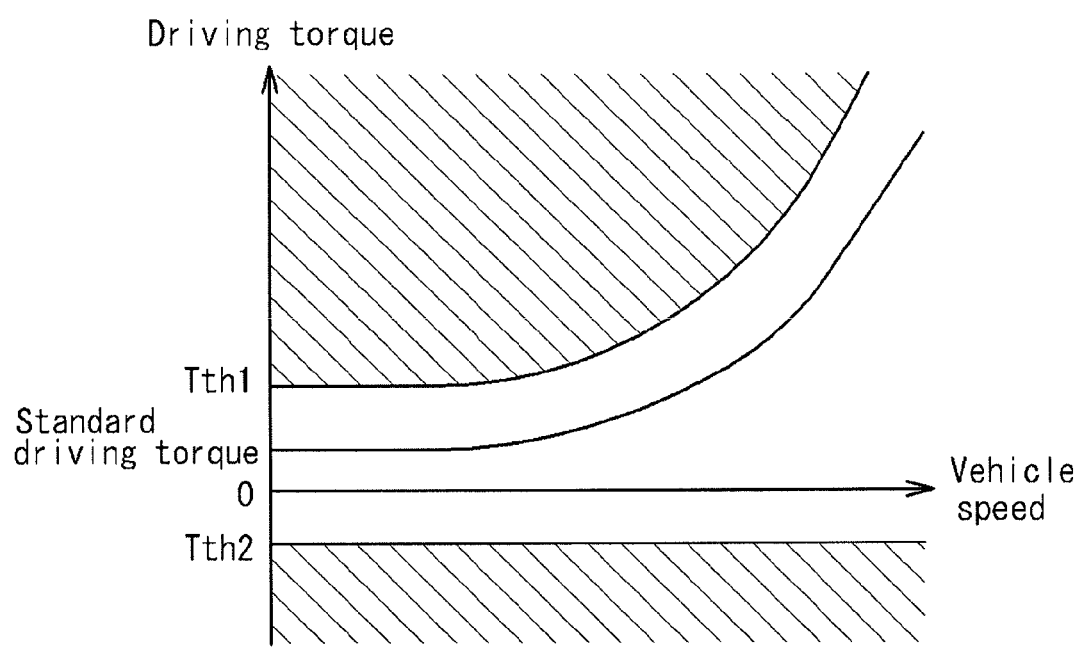
FIG. 6 illustrates the relation between a vehicle speed and a driving torque.
Figure 7:
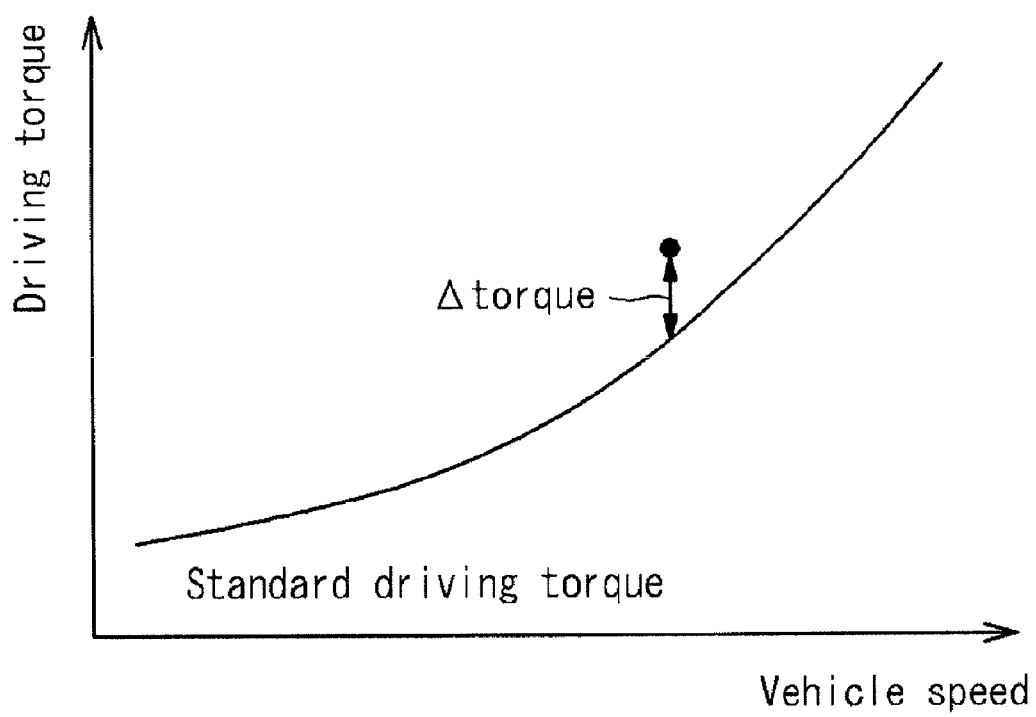
FIG. 7 illustrates Δtorque.

The result is shown in FIG. 5.

As can be seen from FIG. 4 and FIG. 5, the variation of the decreased pressure determination values can be reduced by combining the rejection based on the lateral G as shown in FIG. 8(b) with the rejection based on the turning radius as shown in FIG. 3(a) or FIG. 3(b). This shows that the data during the turning at a low speed can be rejected to thereby obtain reliable data (i.e., data when the vehicle is running straight on a flat road), thereby reducing the possibility of a false alarm.

REFERENCE SIGNS LIST

1 Wheel speed detection means (rotation speed detection means)
2 Control unit
2a Interface
2b CPU
2c ROM
2d RAM
3 Display unit
4 Initialization button
5 Alarm unit

What is claimed is:

1. A method for detecting a decrease in tire air pressure based on wheel rotation speed information obtained from tires attached to a four-wheel vehicle, comprising:
    a wheel rotation speed information detection step for detecting wheel rotation speed information of the respective tires;
    a first storage step for storing the wheel rotation speed information detected in the rotation speed information detection step;
    a decreased pressure determination step for determining, based on the wheel rotation speed information, a decrease in tire air pressure;
    a second storage step for, assuming that a driving wheel torque required for a vehicle to run on a flat road at a fixed speed is a standard driving torque, storing a relation between the standard driving torque and a vehicle speed obtained in advance;
    a decreased pressure determination prohibition step for prohibiting the determination of a decrease in tire air pressure based on the wheel rotation speed information when a vehicle turning radius is lower than a predetermined threshold value determined by the relation between the driving wheel torque and the standard driving torque depending on the vehicle speed, and
    a decreased pressure determination start step for starting the determination of a decrease in tire air pressure based on the wheel rotation speed information when the turning radius is equal to or higher than the predetermined threshold value.

2. The method for detecting a decrease in tire air pressure according to claim 1, wherein the relation is a difference between the driving wheel torque and the standard driving torque depending on the vehicle speed.

3. An apparatus for detecting a decrease in tire air pressure based on wheel rotation speed information obtained from tires attached to a four-wheel vehicle, comprising:
    a wheel rotation speed information detection means for detecting wheel rotation speed information of the respective tires;
    a first storage means for storing the wheel rotation speed information detected by the wheel rotation speed information detection means;
    a decreased pressure determination means for determining, based on the wheel rotation speed information, a decrease in tire air pressure;
    a second storage means for, assuming that a driving wheel torque required for a vehicle to run on a flat road at a fixed speed is a standard driving torque, storing a relation between the standard driving torque and a vehicle speed obtained in advance;
    a decreased pressure determination prohibition means for prohibiting the determination of a decrease in tire air pressure based on the wheel rotation speed information when a vehicle turning radius is lower than a predetermined threshold value determined by the relation between the driving wheel torque and the standard driving torque, and
    a decreased pressure determination start means for starting the determination of a decrease in tire air pressure based on the wheel rotation speed information when the turning radius is equal to or higher than the predetermined threshold value.

4. The apparatus for detecting a decrease in tire air pressure according to claim 3, wherein the relation is a difference between the driving wheel torque and the standard driving torque depending on the vehicle speed.

5. A program for detecting a decrease in tire air pressure which causes, in order to determine a decrease in tire air pressure based on wheel rotation speed information obtained from tires attached to a four-wheel vehicle, a computer to function as:
- a first storage means for storing wheel rotation speed information detected by wheel rotation speed information detection means for detecting wheel rotation speed information of the respective tires;
- a decreased pressure determination means for determining, based on the wheel rotation speed information, a decrease in tire air pressure;
- a second storage means for, assuming that a driving wheel torque required for a vehicle to run on a flat road at a fixed speed is a standard driving torque, storing a relation between the standard driving torque and a vehicle speed obtained in advance;
- a decreased pressure determination prohibition means for prohibiting the determination of a decrease in tire air pressure based on the wheel rotation speed information when a vehicle turning radius is lower than a predetermined threshold value determined by the relation between the driving wheel torque and the standard driving torque depending on the vehicle speed, and
- a decreased pressure determination start means for starting the determination of a decrease in tire air pressure based on the wheel rotation speed information when the turning radius is equal to or higher than the predetermined threshold value.

6. The program for detecting a decrease in tire air pressure according to claim 5, wherein the relation is a difference between the drive wheel torque and the standard driving torque depending on the vehicle speed.

* * * * *